Sept. 16, 1924.

C. H. DOOLEY 1,508,747

FRICTION CLUTCH

Filed May 1, 1922

INVENTOR
Clarence H. Dooley
BY J. H. Bliss
ATTORNEY

Patented Sept. 16, 1924.

1,508,747

UNITED STATES PATENT OFFICE.

CLARENCE H. DOOLEY, OF ROCK ISLAND, ILLINOIS.

FRICTION CLUTCH.

Application filed May 1, 1922. Serial No. 557,667.

*To all whom it may concern:*

Be it known that I, CLARENCE H. DOOLEY, a citizen of the United States, residing at Rock Island, in the county of Rock Island and State of Illinois, have invented certain new and useful Improvements in Friction Clutches, of which the following is a specification, reference being had therein to the accompanying drawing.

This invention relates to improvements in friction clutches. Each of these generally comprises a driving element and a driven element, with a lever system or other means for moving one, or both, to and from frictional engagement with each other. The main parts are generally composed of metallic bodies to transmit the power by which pressure is exerted. These metallic bodies are usually supplemented by others to which are incident a greater frictional surface engagement, often being of fibrous or equivalent materials; they providing the surfaces which are pressed together and are frictionally operative, in many cases being positively secured to the metal surfaces which approach toward, and recede from, each other.

In such clutches both the metallic and the fibrous or yielding substances are liable to wear; and are also liable to a reduction, by prolonged pressure, of the thickness dimension, as the fibrous or yielding elements become indurated or hardened, as well as lose thickness by the wearing action.

As this reducing of the thickness dimension occurs there is a change in the relations and positions of the elements in the train of power transmitting devices which secure the pressure. With many clutches, as for example, those in automobiles, it is desirable that the initial, manually actuated levers should travel in a certain prescribed path and that the position and length of this path should be permanently fixed. This is interfered with by wear and by reduction in the thickness of the several friction parts.

One of the objects of the present invention is to provide devices by which adjustments in the positions of the metallic elements in the clutch can be quickly and readily made to compensate for variations in these positions, resulting from wear and pressure.

Another object is to so construct and relate the moving parts that a positive and quick disengagement of the friction surfaces can be effected when desired.

Another object is to provide devices by which the adjustments can be made in successive steps of predetermined amounts.

A still further object is to provide a device of the character described which will be simple in construction, and which can be quickly and cheaply installed or removed.

Figure 1:
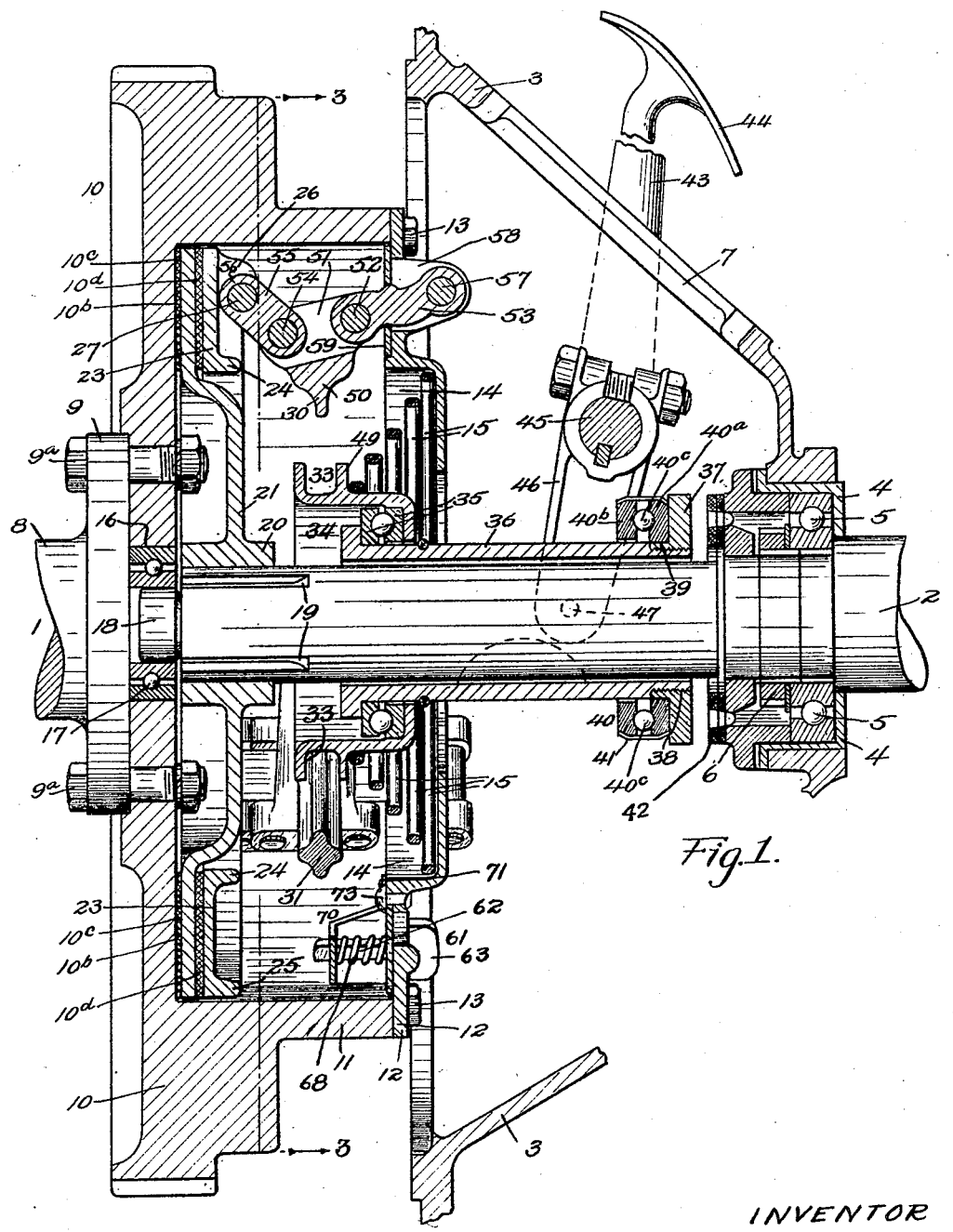
Figure 1 is a vertical section of a mechanism embodying my invention, a few of the parts being shown in elevation.
Figure 2:
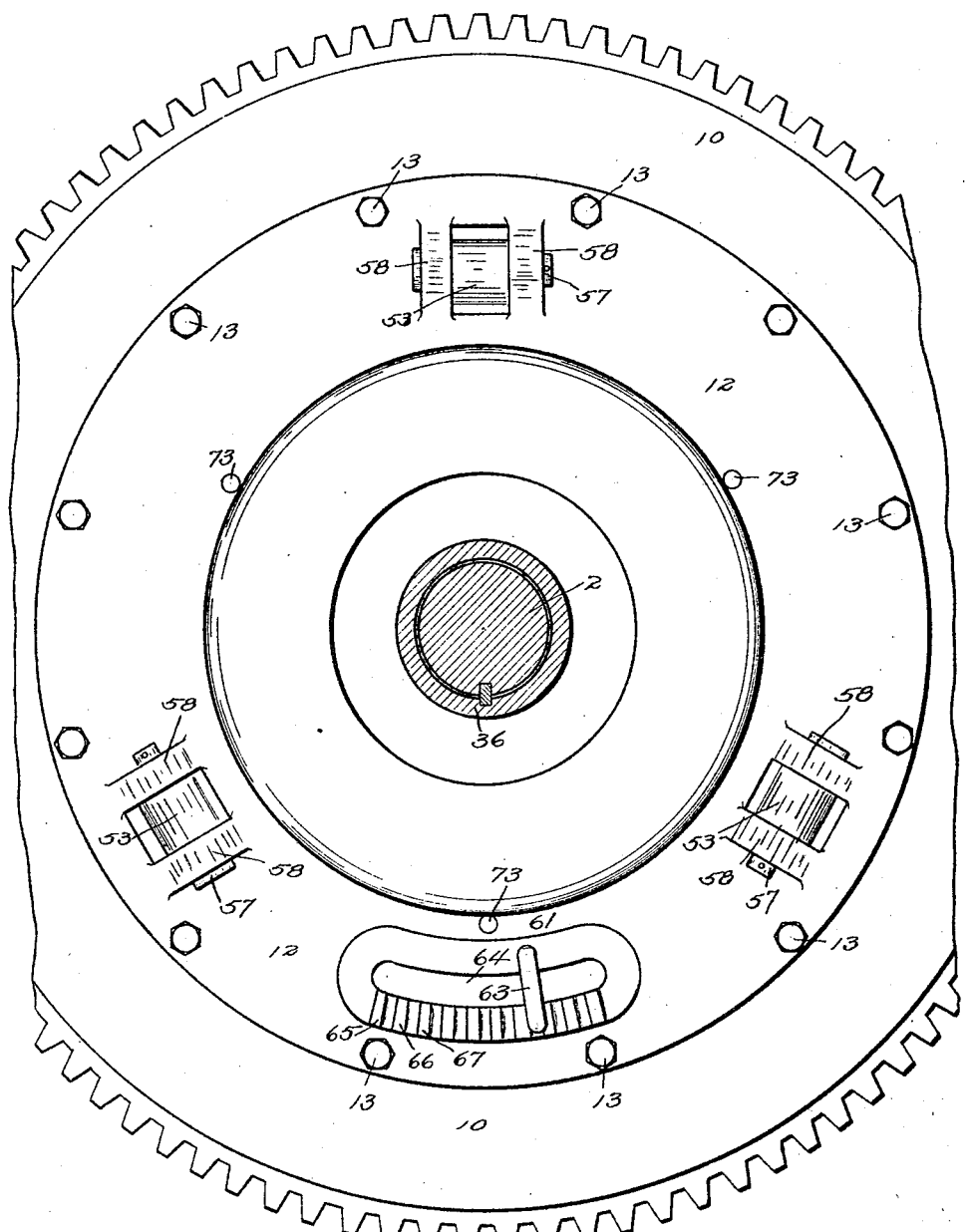
Fig. 2 is a view of the clutch mechanism, looking from the rear.
Figure 3:
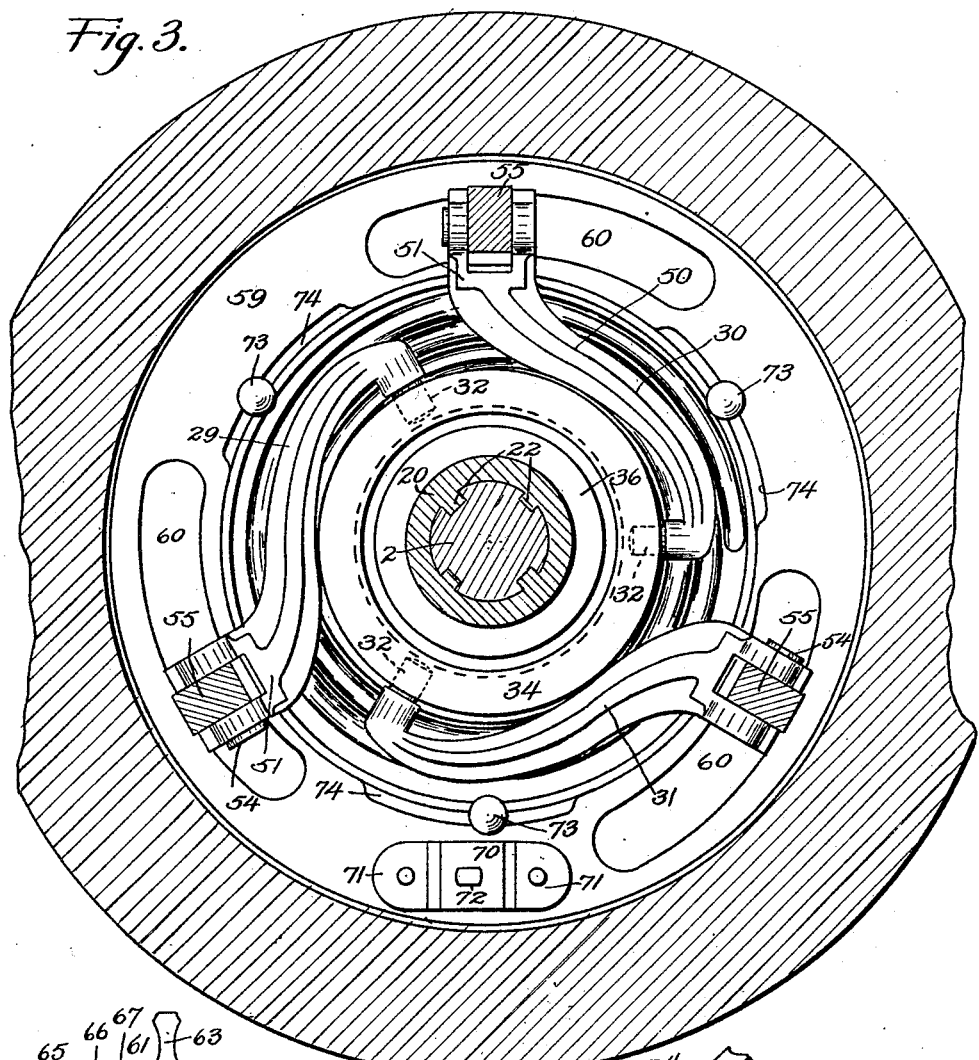
Fig. 3 is a section on the line 3—3 of Fig. 1.

The clutch mechanism comprises parts for connecting a driving member as at 1, and a driven member as at 2. The operative parts are contained in a casing 3 mounted on and secured to some convenient supporting framework. The casing 3 carries a support 4 in which is seated the anti-friction bearing 5, the latter serving as one of the supports for the shaft or driven member 2. The anti-friction bearing 5 is retained in the support 4 by a locking ring 6. In the upper portion of the casing 3 there is an aperture 7 to permit convenient access to the interior of the clutch casing.

The driving member 1 includes a power shaft 8 having the flange 9 at its end. A fly-wheel 10 is bolted at $9^a$ to the flange 9, it having upon one side the axially extending cylindrical wall 11. A plate 12 is secured to this wall 11 by bolts 13. The plate is recessed, as at 14, to provide a large annular chamber for a spring 15, to be described later. The fly-wheel 10 is constructed with a recess 16 at its center in which is placed an anti-friction bearing, here a ball bearing 17. The inner member of this bearing 17 carries a cylinder 18, mounted or formed on one end of the shaft 2, and constitutes a support for the end of said shaft.

The front end of the shaft 2 has a plurality of slots 19. Mounted on the shaft is the hub 20 of a plate 21, the hub being formed with keys 22 adapted to slide in the slots 19. The outer portion of the plate 21 is curved toward the inner face $10^b$ of the fly-wheel 10 and is adapted to be positioned between this adjacent face of the fly-wheel and a friction ring 23.

Annuli 10ᶜ and 10ᵈ of fibrous material are positioned, respectively, between the face 10ᵇ of the fly-wheel and the plate 21, and between the plate 21 and the adjacent annulus 23, to augment the frictional engagement of these parts when they are pressed together.

Figure 4:
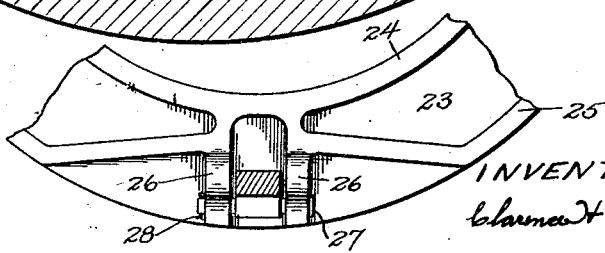
Fig. 4 is a fragmentary view of one of the movable parts of the mechanism.

The ring 23 is provided with the strengthening peripheral web portions 24, 25. As shown in Fig. 4, it is also formed, at spaced intervals, with the radially extending ears 26, 26, they being adapted to receive a headed pivot pin 27 which supports one end of a toggle system. The cotter 28 serves to hold the pin 27 in proper position and prevent its displacement.

29, 30 and 31 are bell-crank levers, each being provided with a bearing head 32. These bearing heads are seated in the circular groove 33 of a collar 34. The collar 34 is supported by a roller bearing 35, one element of which is secured to the sleeve 36. The sleeve 36 in the construction shown is slidingly but non-rotatably mounted on shaft 2 and has, at its end, opposite to the collar 34, the ring 39 secured to it by means of screw threads 38. This ring 39 has a flaring web or radial flange 37 to which is secured, on one side, one element 40ᵃ of a thrust bearing 40. The other element 40ᵇ of the thrust bearing is secured to a ring 41, enclosing the two elements and the balls 40ᶜ. The opposite side of the web or flange 37 is a plane outer face for engagement with the clutch brake member 42 secured to and rotating with the shaft 2.

A foot pedal lever 43 having at its upper end the pedal 44, is mounted at one side of the casing 3 and is secured at its lower end to a transverse shaft 45. This shaft 45 is journaled in the casing 3 and extends to a point approximately above the driven shaft 2, at which point there is secured to it a yoke 46. The depending arms of the yoke 46 each terminate in a pin 47, mounted on the lower portion of the arm, and adapted to bear against the exposed face of the thrust bearing element 40ᵇ.

The spring 15, seated in the recess 14 of the plate 12, abuts in one direction against the inner wall of the recess and, in the opposite direction, against the flange 49 of the collar 34, thus tending to hold the latter forward and toward the fly-wheel at all times.

I have shown three of the bell crank levers 29, 30, etc., above referred to. Each of these, and its attachments, are constructed and arranged as follows: Each has a curved stem or shank 50 and the head 51. The head of each is, at its rear end, pivoted at 52 to a link 53, and at its forward end is connected by a pivot 54 to another link 55, the latter being connected at 56 to the ears 26 of the ring 23, as above described. The link 53 is pivoted at 57 to the plate 12, the latter being preferably formed with the ears 58 projecting backward from the plate, and so arranged in pairs that the end part of one of the links 53 and its pivot 57 can be seated therein.

Figure 5:
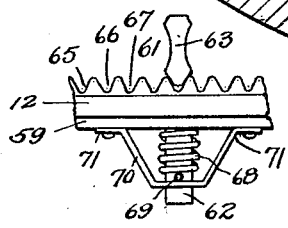
Fig. 5 shows the details of the latching mechanism.

59 is an annular plate fitted to the inner side of the plate 12 and slidable thereon, within limits, concentrically around the axis of the shaft 2. This plate has a plurality of cam slots 60, three being shown to agree with the number of bell-cranks and toggle systems. The width of each of the slots 60 is such that a link 53 can pass therethrough but will not be able to vibrate around its pivot 57 when the plate 59 is held in any one position. When this plate 59 is rotated, however, relatively to the plate 12, it will cause the links 53 to rotate around the pivots 57 either toward or away from the shaft 2, as may be desired. The rotary movement can be imparted to the plate 59 by means of the devices shown at 61 (see Fig. 5). They comprise the stem 62 passing through an aperture in the plate 59, and having at one end the handle 63 for convenient grasping. The stem 62, when the plate 59 is rotated, moves in the arcuate slot 64 in the plate 12; and on one side of the slot 64 is formed a series of equally spaced notches 65, 66, 67, etc., in each of which the inner edge of the handle 63 is adapted to rest. A spring 68 is held in position on the stem 62 by a pin 69 which passes through the stem and holds the spring in proper position. A metallic strap 70, secured to the plate 59 by the flanges 71, 71, which are bolted thereto, is apertured at 72 to receive the outer end of the stem 62 and hold it against excessive play. The headed pins 73, secured to the plate 12, and adapted to lie in the arcuate recesses 74 in the annulus 59, serve to hold the annulus snugly in place and prevent its displacement axially of the mechanism.

When it is desired to rotate the plate 59 the handle 63 of the stem 62 is grasped and the stem is pulled outwardly against the spring 68. This disengages the handle 63 from the notches 65, 66, etc., and the plate can be rotated if desired through an arc equal to the length of the slot 64. As soon as the handle 63 is released the spring 68 forces it to engage with one of the notches and the annulus is held against accidental movement.

The mode of operation of a mechanism having the parts described will be readily understood.

When the parts at 23, 21, 10, and the frictional linings 10ᶜ and 10ᵈ are new, the links 53 are positioned with the pivots 52 as close as possible to the axis of the shaft 2, this positioning being effected by rotating the plate 59 until the links lie at the ends of the slots 60 nearest to this axis. Then as wear occurs at these frictionally engaging surfaces, and there is a tendency for slippage between the driving and driven elements, the plate 59 can be rotated one or more steps, as described above, to move the link 53 around its pivot, and to thus throw the fulcrum point at pivot 52, nearer to the inner face $10^b$ of the fly-wheel. Again when the wear, above-mentioned, occurs the pivot pins 52, 54 and 27 tend to approach a straight line when the pedal is released, which, if allowed to occur, would result in the clutch elements "grabbing" and the loss of a smooth pick-up action during the engagement of the movable parts. By moving the fulcrum point 52, as described above, this tendency for the three pivot points to approach a straight line is counteracted; and by advancing the plate 59 the annulus 23 can be moved forward a distance approximately equal to the amount of wear which has occurred in the several parts, and the toggle system is reset for the next cycle of wear.

To rotate the plate 59 it is necessary only to remove the detachable cover (not shown) over the aperture 7, and rotate the clutch elements until the latch 61 is convenient to the aperture, whereupon the necessary adjustment can be made. Uniformity of this adjustment at all points around the annular plate is assured by the single controlling element 59, it moving equally and accurately all of the links 53.

The number of notches 65, 66, etc., is such as to permit a rotation of the annulus 59 to correspond with the working life of the several elements at 23, $10^d$, 21, etc., and when properly made these devices will continue to operate for long periods without requiring replacement of any of the parts or laborious readjustments. Clutches of this class maintain uniformity in their operative grip until a set of the inter-engaging friction parts is worn out.

By pivotally connecting the toggle systems to the annulus 23, by means of the links 55 and pins 27, a positive and quick disengagement of the clutch elements is insured when the foot pedal is moved forward. And, again, when the pedal is released and the spring 15 forces the parts into engagement again a smooth gripping action is obtainable with this arrangement of parts.

It is to be understood that the proportions of the notches 65, 66, 67, etc., in conjunction with the degree of eccentricity of the slots 60 will be such that the step by step adjustment of the handle 63 in the notches will provide for successive degrees of compensation equivalent to predetermined amounts of wear on the wearing surfaces. For example, the movement of the handle 63 over one notch may be sufficient to compensate for the combined wear on the friction surfaces of $\frac{1}{64}$ of an inch. This adjustment may of course be varied to suit operating conditions.

Due to the fact that the wearing away of the friction surfaces permits ring 23 to approach fly-wheel 10 by varying amounts, the toggle members 51 and 55 will approach a straight line position in corresponding measure. This is undesirable as it throws the bell-crank levers 29, 30 and 31 too far in toward the fly-wheel and consequently changes the normal angle of the lever or pedal 43. However the circumferential adjustment of the ring 59 forms a movable bearing abutment for the members 53 and consequently restores the bell-crank levers 29, 30 and 31 to their normal positions and maintains an angular relation between the toggle members 51 and 55. At the same time pedal lever 43 is brought back to a position such that the unclutching movement with worn friction surfaces is carried out through substantially the same arc of travel as existed before the friction surfaces became worn.

In adjusting the ring 59 and its associated parts, it will be evident that the pedal 43 must be depressed and the clutch disengaged. Under such circumstances spring 15 is compressed. The toggle members and the adjustable pivot members 53 are then free of strain and the ring 59 may be adjusted with ease.

While I have disclosed one form which my invention will take, it will be obvious that numerous changes in details may be made without departing from the scope of the invention as defined in the appended claims.

What I claim is:

1. In combination, a driving member, a driven member, a plate rotatable with the latter, a friction plate movable into and out of engagement with said plate, a radially-adjustable link pivotally connected at one end with said driving member, movable means pivotally connected with the other end of said link and adapted when moved in one direction to force said friction plate against said other plate, and means engaging with an intermediate portion of said link for holding it against movement in its different radially-adjusted positions.

2. In combination, a driving member, a driven member, a plate rotatable with the latter, a friction plate movable into and out of engagement with said plate, a radially-adjustable link pivotally connected at one end with said driving member, toggle members pivotally connecting the other end of said link with said friction plate, and means engaging with an intermediate portion of said link for supporting it against movement in its different radially-adjusted positions.

3. In combination, a driving member, a driven member, a plate rotatable with the latter, a friction plate movable into and out of engagement with said plate, a radially adjustable pivoted member mounted on the driving member, toggle members connecting the pivoted member with the friction plate, means for operating the toggle members, an annulus in engagement with an intermediate portion of the pivoted member for radially adjusting the said pivoted member, and manual means for releasably locking the annulus in adjusted position.

4. In combination, a driving member, a driven member, a plate rotatable with the latter, a friction plate movable into and out of engagement with said plate, toggle members connected to said friction plate, means pivotally connected with said driving member for supporting said toggle members from the driving member, and means to adjust the position of said supporting means radially, said last-named means being in engagement with an intermediate portion of said pivotally-connected means.

5. In combination, a driving member, a driven member, a plate rotatable with the latter, a friction plate movable into and out of engagement with said plate, links pivoted to the driving member, an eccentrically slotted annulus through which the free ends of the links project, means for rotating the annulus relative to the driving member for adjusting the links radially, bell-crank levers pivoted on the free ends of the links and other links connecting the bell-crank levers with the friction plate.

6. In combination, a driving member, a driven member, a plate rotatable with the latter, a collar slidable on the driven member, a bell-crank lever carried by said collar, a member on the driving member pivotally supporting the bell-crank lever, an annulus movable relative to the driving member and forming an abutment for an intermediate portion of the supporting member in its radially adjusted positions, a friction ring, and a link connecting the ring with the bell-crank lever for causing the inter-engagement of the plate and the driving member.

In testimony whereof, I affix my signature.

CLARENCE H. DOOLEY.